US007728815B2

(12) United States Patent
Chou

(10) Patent No.: US 7,728,815 B2
(45) Date of Patent: Jun. 1, 2010

(54) MULTI-DIRECTION INPUT DEVICE

(75) Inventor: Chin-Wen Chou, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 1178 days.

(21) Appl. No.: 11/234,203

(22) Filed: Sep. 26, 2005

(65) Prior Publication Data

US 2007/0068788 A1 Mar. 29, 2007

(51) Int. Cl.
*G06F 3/033* (2006.01)
*G09G 5/08* (2006.01)
*G09G 3/34* (2006.01)

(52) U.S. Cl. ....................................... 345/163; 345/166

(58) Field of Classification Search .......... 345/156–184
See application file for complete search history.

(56) References Cited

U.S. PATENT DOCUMENTS 5,912,661 A * 6/1999 Siddiqui ..................... 345/166
6,014,130 A * 1/2000 Yung-Chou ................. 345/163
6,291,782 B1 * 9/2001 Isikawa ....................... 200/14
6,344,643 B1 * 2/2002 Chen .......................... 250/221
6,353,429 B1 * 3/2002 Long .......................... 345/158
6,700,564 B2 3/2004 McLoone et al.
2003/0025673 A1 2/2003 Ledbetter et al.

* cited by examiner

*Primary Examiner*—Amr Awad
*Assistant Examiner*—Andre Matthews
(74) *Attorney, Agent, or Firm*—Muncy, Geissler, Olds & Lowe, PLLC

(57) ABSTRACT

A multi-direction input device for computers includes a direction wheel, a toggle mechanism and a plurality of electrodes. The direction wheel has one-degree of rotational freedom and two-degree of freedom to perform clicking, forward rolling, backward rolling, leftward moving and rightward moving operations. Thereby mating electrodes are electrically connected to generate corresponding signals. In normal conditions, the toggle mechanism and a movable contact jointly support the direction wheel. When the direction wheel is depressed, the toggle mechanism drives and connects a corresponding electrode to generate a click signal.

11 Claims, 11 Drawing Sheets

MULTI-DIRECTION INPUT DEVICE

FIELD OF THE INVENTION

The present invention relates to a computer input device and particularly to a multi-direction input device that has a direction wheel movable in multiple directions to receive input operation of computer users.

BACKGROUND OF THE INVENTION

The technique of including a wheel in a computer input device such as mouse or keyboard is known in the art. For instance, U.S. Pat. No. 6,700,564 of Microsoft Co. and U.S. patent publication No. 2003/0025673 A1 disclose an input device equipped with a rotary wheel. When users browse documents on the screen of a computer, they can move the wheel with fingers to change pages, scroll text contents or perform document editing operations. It is especially handy for users to do document browsing, Web searching or image zooming operation. There is no need to maneuver the PAGE DOWN/UP keys on the keyboard or the scroll bar on the screen through the mouse. Through the wheel on the input device, scroll of text pages or lines can be done easily.

However, the conventional wheel structure is complex and bulky. Fabrication and assembly are difficult. Production cost is higher. To shrink the size of electronic products that include the wheel input device is not easy. This makes conforming to the prevailing trend of thin and light difficult.

SUMMARY OF THE INVENTION

Therefore it is an object of the present invention to provide a multi-direction computer input device that is capable of providing multi-direction operations and click functions.

According to an embodiment of the invention, the multi-direction input device includes a direction wheel, a toggle mechanism and a plurality of electrodes. The direction wheel is braced by the toggle mechanism and a movable contact, and has one-degree of rotational freedom and two-degree of freedom, therefore allows users to perform click, forward and backward rolling, and leftward and rightward moving operations to connect mating electrodes to generate corresponding signals.

Another object of the invention is to provide a suspension structure for a roller input device.

According to one embodiment, the suspension structure includes a toggle mechanism and a movable contact. In normal conditions, the toggle mechanism and the movable contact jointly support a direction wheel. When the direction wheel is depressed, a toggle element in the toggle mechanism drives a corresponding electrode to become conductive to generate a click signal. The directional wheel also is coupled with a coaxial gear which can be driven to move the movable contact and corresponding electrodes to generate forward or backward rolling signals.

The foregoing, as well as additional objects, features and advantages of the invention will be more readily apparent from the following detailed description, which proceeds with reference to the accompanying drawings.

DETAILED DESCRIPTION OF THE PREFERRED

Embodiments

Figure 1:
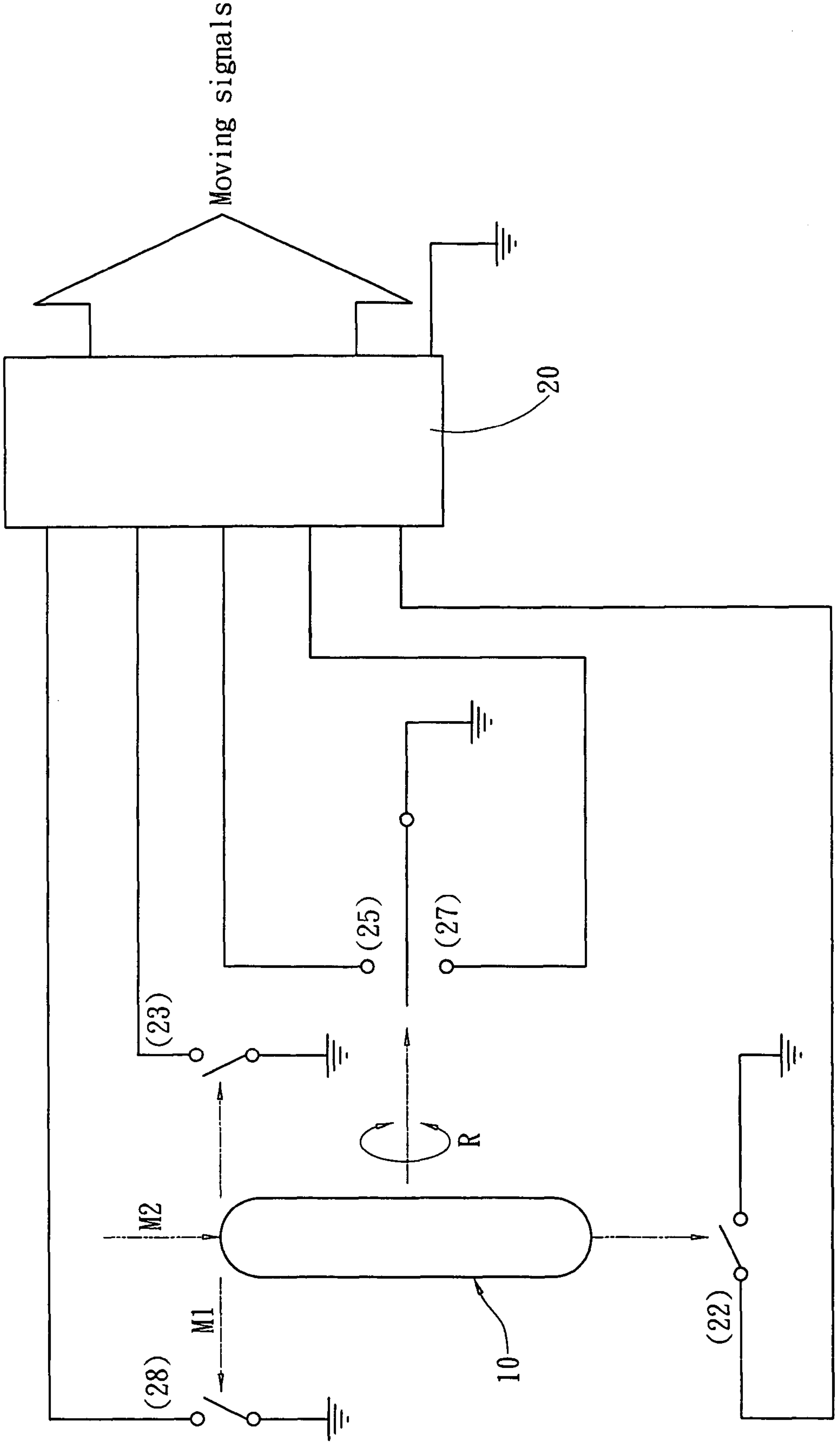
FIG. 1 is a functional block diagram of an embodiment of the present invention.

The multi-direction input device according to the invention includes a direction wheel, a toggle mechanism and a plurality of electrodes. Please refer to FIG. 1 for a functional block diagram of an embodiment. The direction wheel 10 has three-degree-of-freedom which includes one-degree of rotational freedom R (for forward rolling and backward rolling operations) and two-degree of freedom M1 and M2 (for leftward moving and rightward moving, and click operations).

The electrodes are connected to an encoder 20. According to the movements of the direction wheel 10 (including forward rolling, backward rolling, leftward moving, rightward moving and clicking), a corresponding electrode (22, 23, 25, 27 or 28 as shown in the drawings) is connected to form a circuit to trigger the encoder 20 to generate a corresponding signal.

Figure 2A:
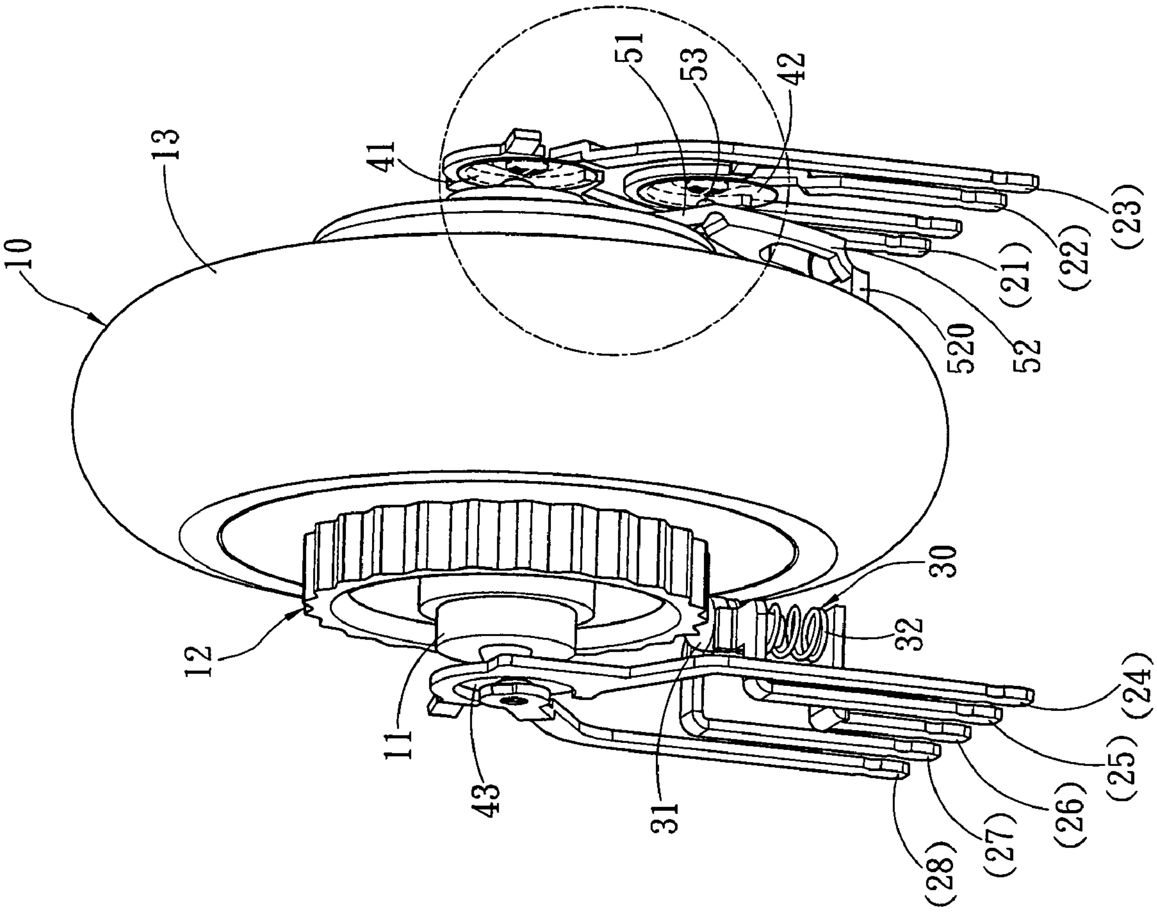
FIG. 2A is a perspective view of an embodiment of the present invention.
Figure 2B:
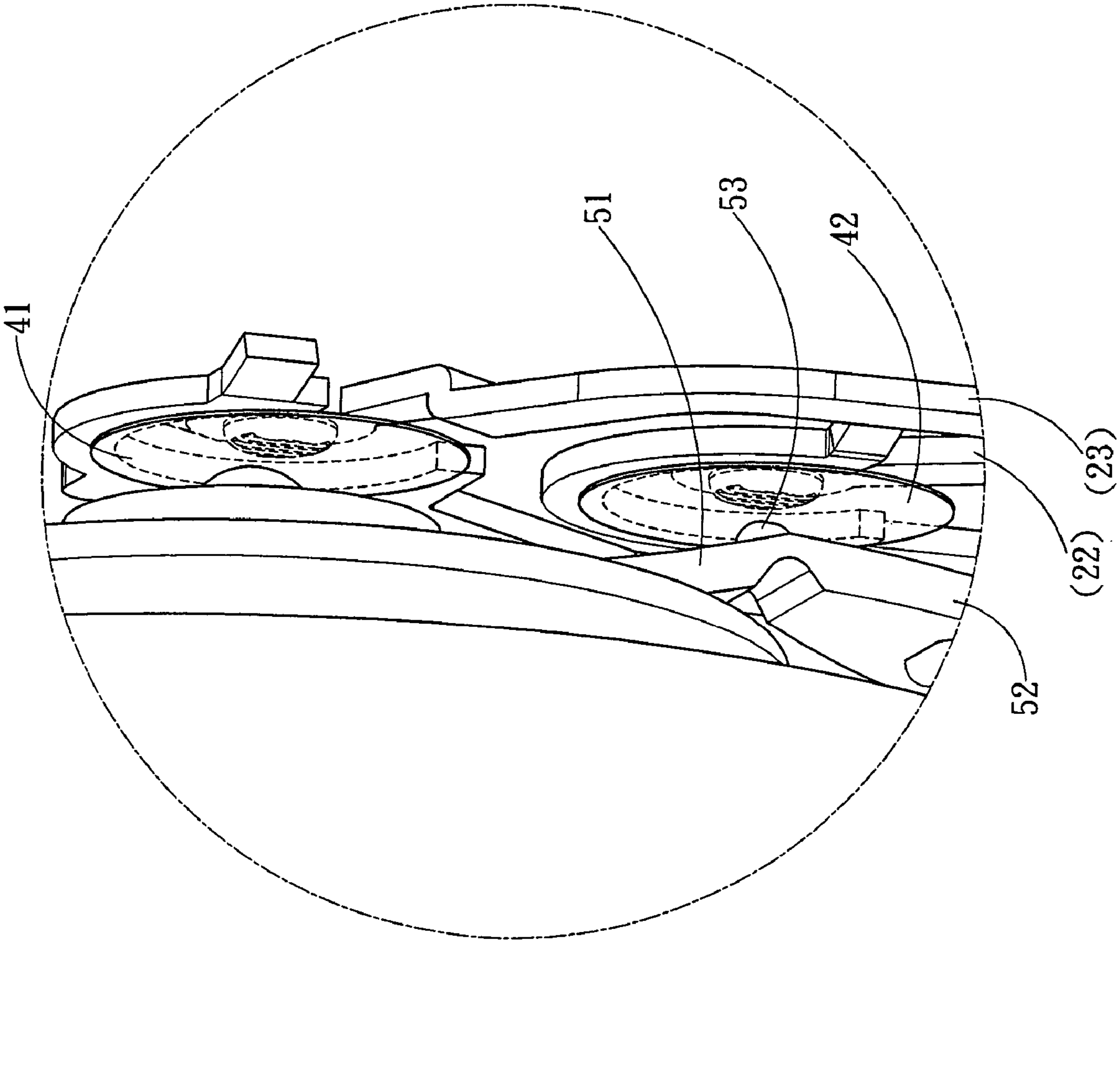
FIG. 2B is a fragmentary enlarged view of FIG. 2A.
Figure 4:
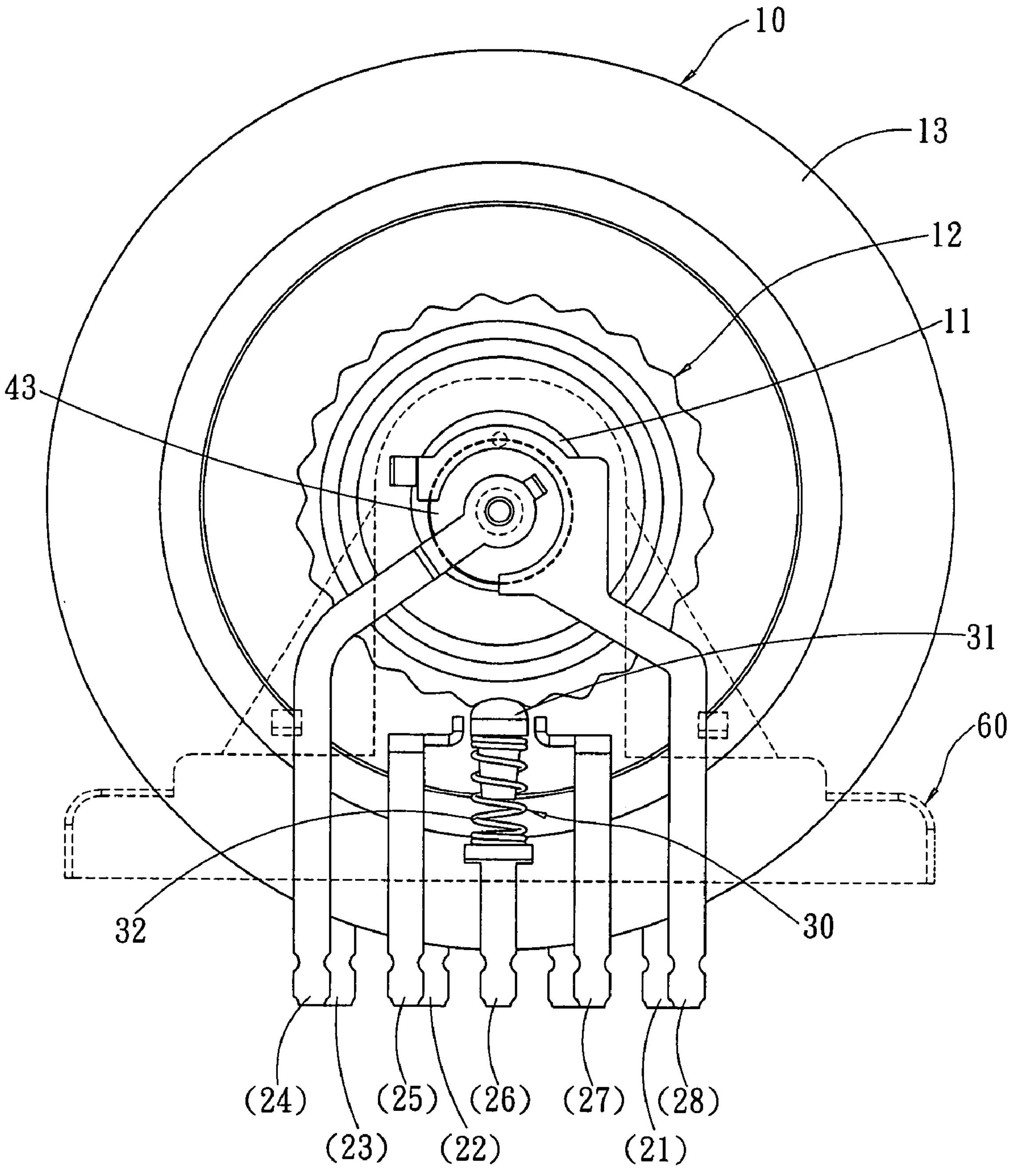
FIG. 4 is another side view of the embodiment according to FIG. 2A.
Figure 6A:
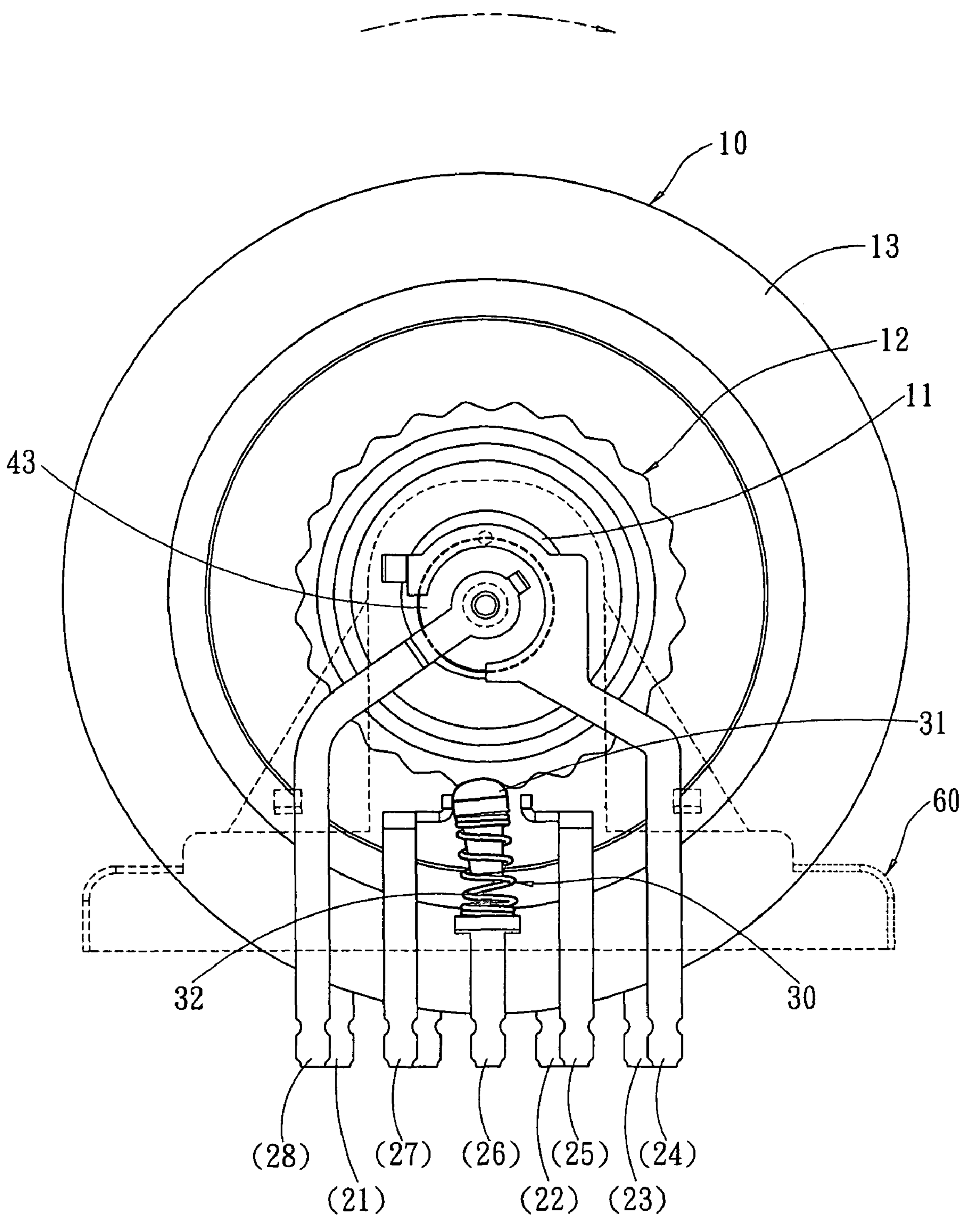
FIGS. 6A and 6B are schematic views of the invention showing the direction wheel in forward and backward rolling conditions.
Figure 6B:
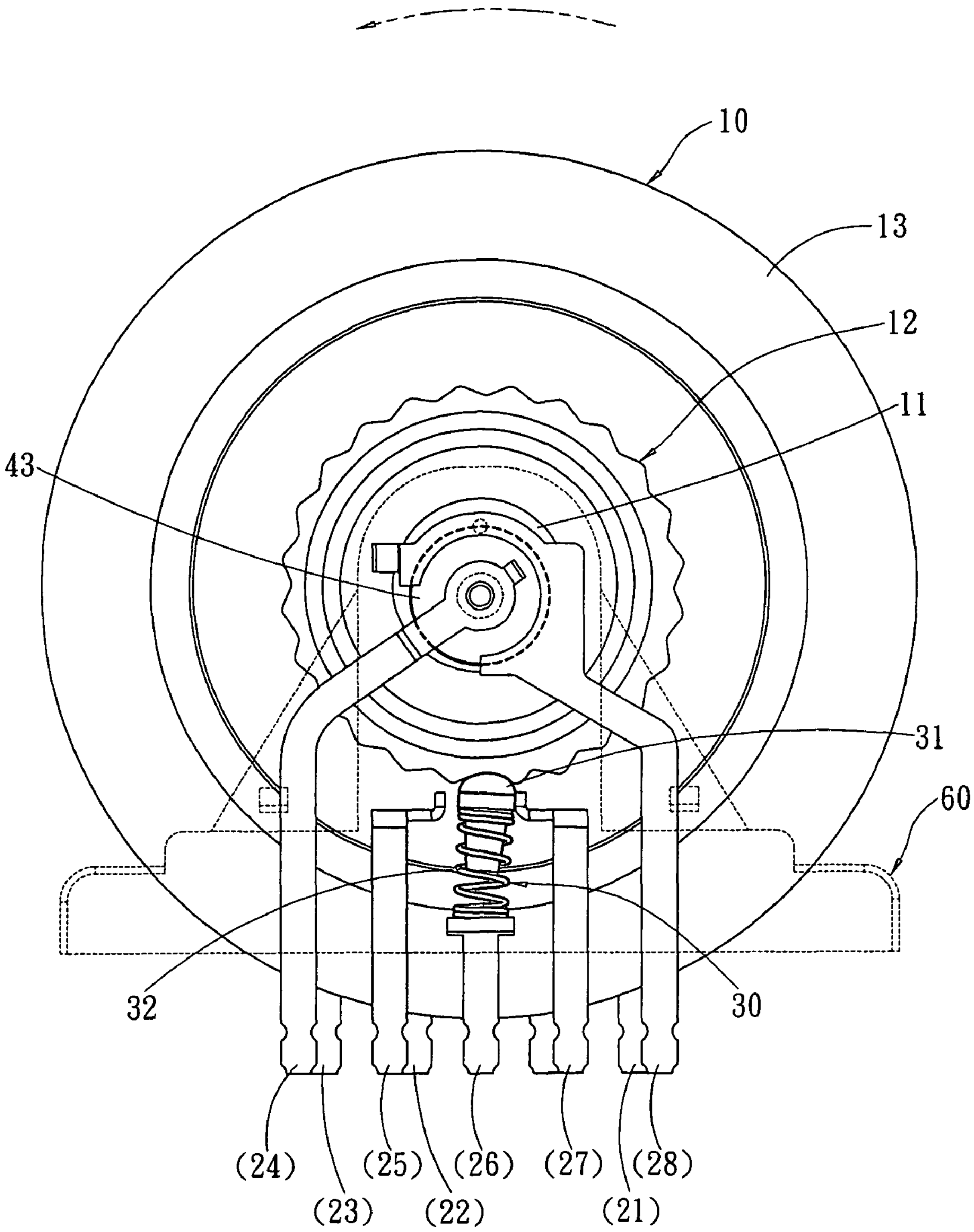

Referring to FIGS. 1, 2A and 2B, the direction wheel 10 has an axle 11 and a first side coupled with a coaxial gear 12. The direction wheel 10 has a peripheral surface 13 to be moved by users to do operation. The fifth electrode 25 and seventh electrode 27 are located on the first side of the direction wheel 10. The fifth electrode 25 and seventh electrode 27 are interposed by a sixth electrode 26 which is electrically connected to a movable contact 30 (also referring to FIG. 4). The movable contact 30 is conductive and elastic, and has one end connected electrically to the sixth electrode 26 and another end in contact with the coaxial gear 12 constantly. When the direction wheel 10 rotates, the coaxial gear 12 moves the movable contact 30 to connect with the fifth electrode 25 or seventh electrode 27 depending on the rolling direction of the direction wheel 10 (referring to FIGS. 6A and 6B). When the direction wheel 10 is still, the movable contact 30 bounces back elastically to a normal position without connecting the fifth electrode 25 or the seventh electrode 27 (referring to FIG. 4).

In one embodiment, the movable contact 30 includes a metal pin 31 and an elastic element 32 (such as a spring) which has one end coupled with the metal pin 31. The elastic element 32 has another end coupled with the sixth electrode 26 (which may be a common electrode). The metal pin 31 has a top end in contact with the coaxial gear 12 constantly. The movable contact 30 depicted in this embodiment is not a limitation. It can also be a spring.

The second electrode 22 is located on the first side of the direction wheel 10 (opposite to the coaxial gear 12). The first side also has a first electrode 21 which may be the common electrode. The first electrode 21 has a conductive first elastic reed 41 (for tilting) and a second elastic reed 42 (for clicking)

(referring to FIGS. 2A and 2B). In normal conditions, the first elastic reed 41 is not in contact with the third electrode 23, and the second elastic reed 42 is not in contact with the second electrode 22.

Figure 5:
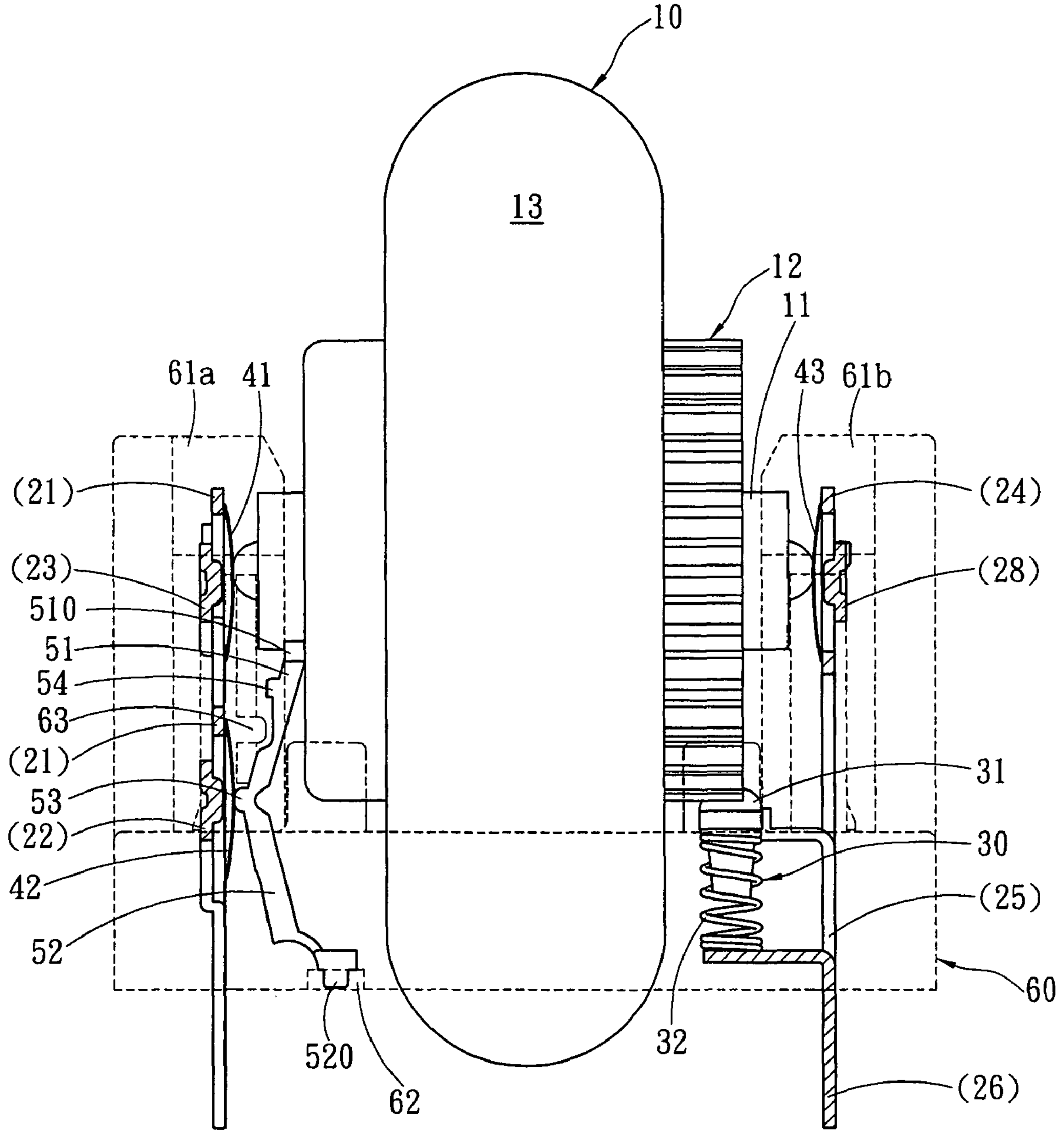
FIG. 5 is a front view of the embodiment according to FIG. 2A.

Referring to FIG. 5, when the direction wheel 10 is not operating in normal conditions, it is supported by the toggle mechanism and the movable contact 30. In one aspect, the toggle mechanism has an upper arm 51 which has a front end formed like a fork or an annular ring to hold the axle 11 of the direction wheel 10. The movable contact 30 presses the coaxial gear 12. The axle 11 has two ends covered by upper caps 61*a* and 61*b* from above to avoid loosening off.

Figure 3:
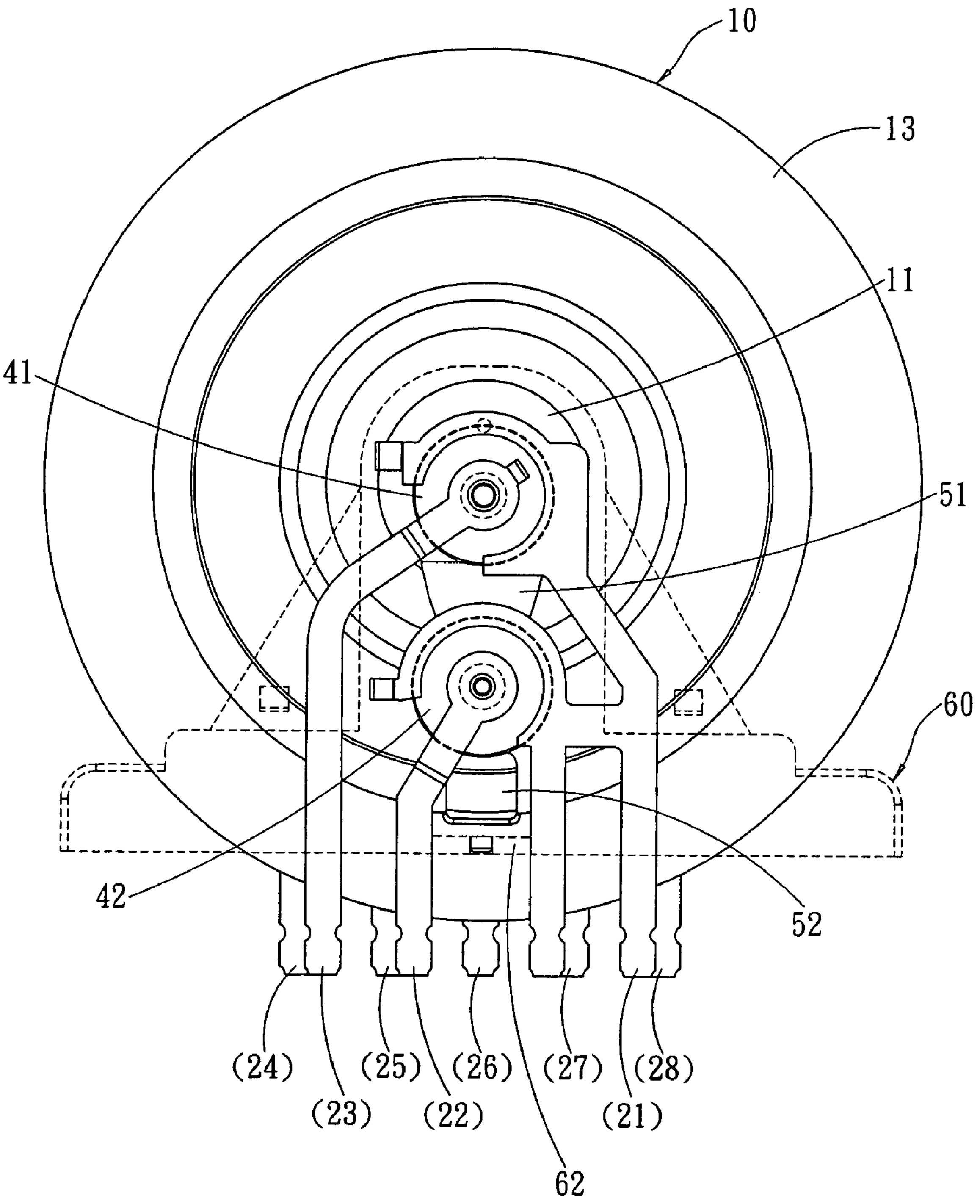
FIG. 3 is a side view of the embodiment according to FIG. 2A.
Figure 7:
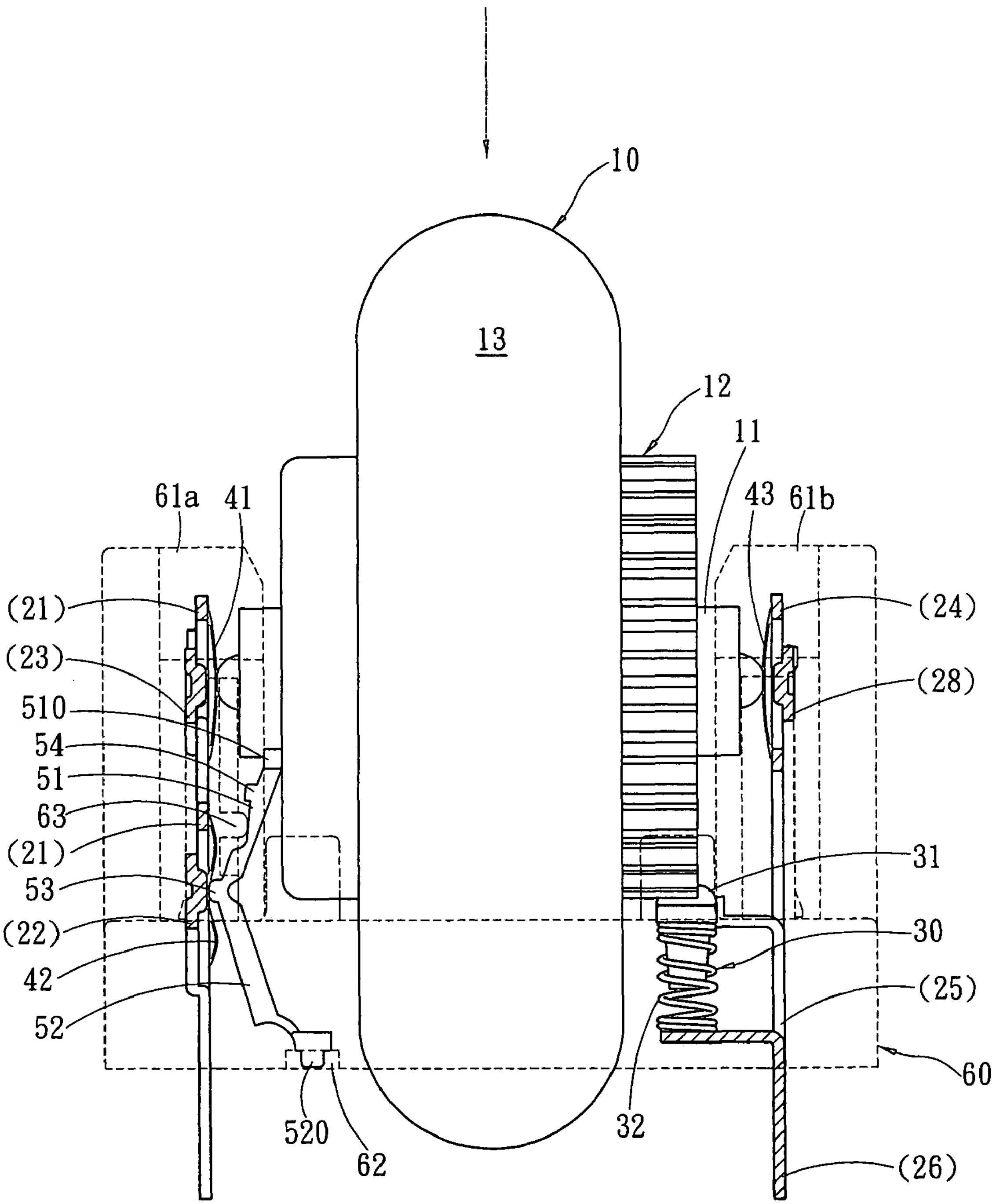
FIG. 7 is a schematic view of the invention showing the direction wheel in a clicking condition.

The toggle mechanism includes the upper arm 51 and a lower arm 52 that are connected on a juncture which forms an elbow 53 (referring to FIG. 5). The upper arm 51 and the lower arm 52 are preferably integrated to become one element that is flexible and elastic. It may be made from metal or plastics (to those skilled in the art, the elbow 53 can also be pivotally coupled with the upper arm 51 and the lower arm 52, then is coupled with an elastic element such as a spring to form the toggle mechanism). The upper arm 51 has one end 510 bracing one end of the axle 11. The lower arm 52 has other end 520 fixedly anchored on a bracing board 62 of a case 60 (referring to FIGS. 3 and 5). When the direction wheel 10 is depressed, the elbow 53 is moved towards the second elastic reed 42 of the first electrode 21 to force the second elastic reed 42 in contact with the second electrode 22 (referring to FIG. 7), hence the first electrode 21 and the second electrode 22 are connected electrically to trigger the encoder 20 to generate a click signal.

Figure 8A:
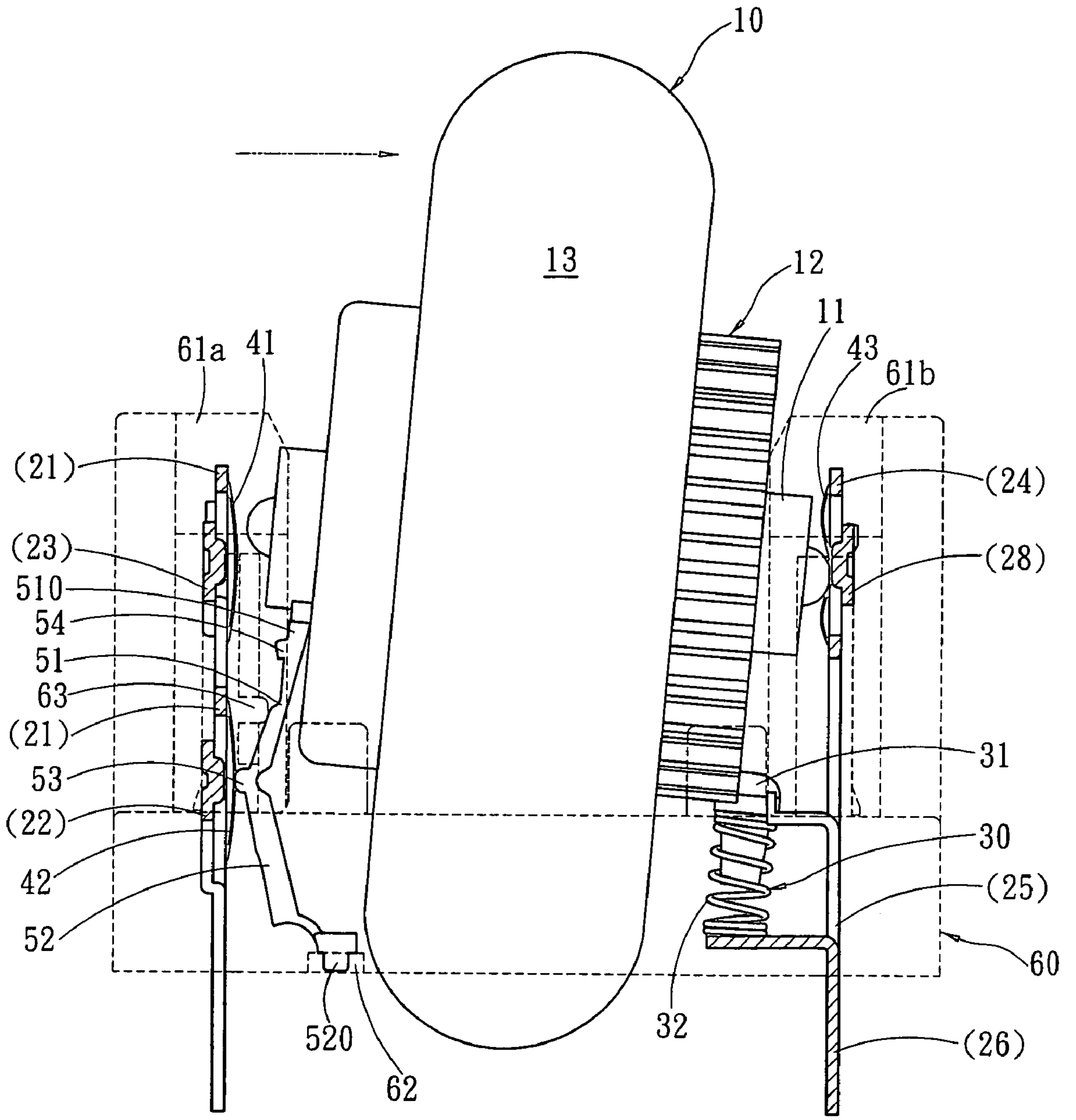
FIGS. 8A and 8B are schematic views of the invention showing the direction wheel in leftward and rightward moving conditions.
Figure 8B:
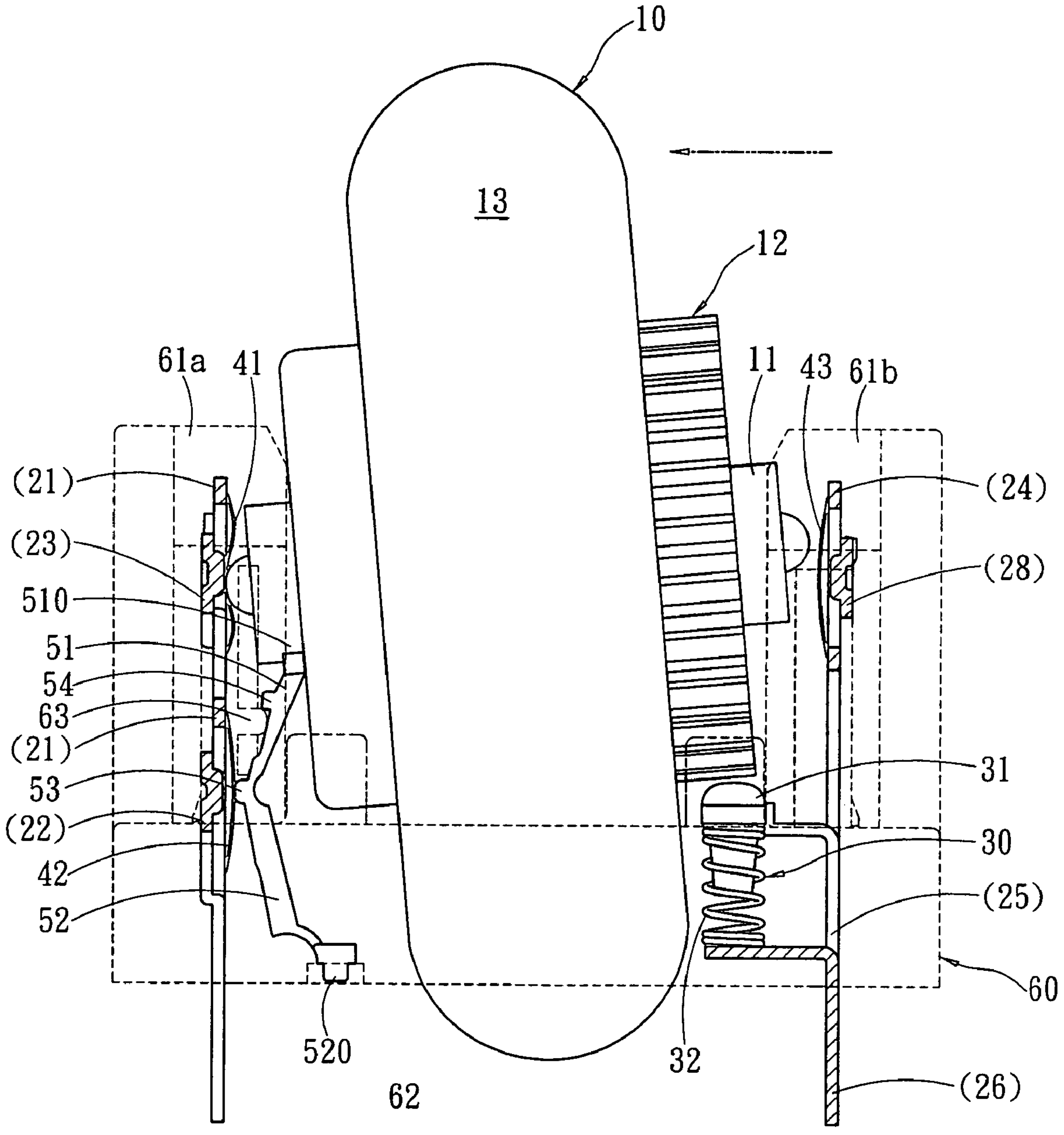

The first side of the direction wheel 10 further has a fourth electrode 24 (may be the common electrode) and a conductive third elastic reed 43 that is in contact with the fourth electrode 24 constantly. The eighth electrode 28 and the fourth electrode 24 are located on the first side of the direction wheel 10. The third electrode 23 is located on a second side of the direction wheel 10 (opposite to the eighth electrode 28). The first elastic reed 41 and third elastic reed 43 are located outside of the two ends of the axle 11 (referring to FIG. 5). When the direction wheel 10 is tilted towards either side, one end of the axle 11 forces the first elastic reed 41 or the third elastic reed 43 in contact with the third electrode 23 or the eighth electrode 28. Hence the third electrode 23 is electrically connected to the first electrode 21 (referring to FIG. 8A), or the eighth electrode 28 is electrically connected to the fourth electrode 24 (referring to FIG. 8B). Thus the encoder 20 is triggered to generate a rightward or leftward signal. A fool-proof mechanism may be included to prevent erroneous operations. It includes a detent strut 63 in the case 60 and a bucking lump 54 on the toggle mechanism. The detent strut 63 is extended towards the toggle mechanism. The bucking lump 54 may be located on the upper arm 51 and extended towards the detent strut 63. When the direction wheel 10 is tilted in the direction of the detent strut 63, the detent strut 63 stops the toggle mechanism to prevents the elbow 53 from moving towards the second elastic reed 42 so that mistaken contact with the second elastic reed 42 is avoided.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A multi-direction input device, comprising:

a direction wheel which has an axle and a first side coupled with a coaxial gear, and one-degree of rotational freedom for rolling forward and rolling backward, and two-degree of freedom for moving leftwards and rightwards, and downward for clicking;

a toggle mechanism which is located on a second side of the direction wheel and includes an upper arm and a lower arm that are coupled together on a juncture to form an elbow, the upper arm having one end bracing one end of the axle, the lower arm having other end fixed; and a plurality of electrodes, including:

a first electrode, a second electrode and a third electrode that are located on the second side of the direction wheel, the direction wheel being depressible downward so that the elbow pushes the first electrode to connect electrically with the second electrode; the direction wheel being movable to the second side such that the axle drives the first electrode to electrically connect to the third electrode;

a fifth electrode, a sixth electrode and a seventh electrode located on the first side of the direction wheel, and a conductive and elastic movable contact located between the fifth electrode and the seventh electrode that has one end electrically connected to the sixth electrode and another end in contact with the coaxial gear constantly, the movable contact being not in contact with the fifth electrode or the seventh electrode in normal conditions, the movable contact being driven by the coaxial gear when the direction wheel rotates to be connected to the fifth electrode or the seventh electrode; and a fourth electrode and an eighth electrode located on the first side of the direction wheel, the axle driving the fourth electrode to electrically connect to the eighth electrode when the direction wheel is moved toward the first side.

2. The multi-direction input device of claim 1, wherein the first electrode is a common electrode and has a conductive first elastic reed which is located on an outer side of the one end of the axle, the axle driving the first elastic reed to connect the third electrode when the direction wheel is moved towards the second side to make the third electrode to be electrically connected to the first electrode, the first elastic reed being not in contact with the third electrode in normal conditions.

3. The multi-direction input device of claim 1, wherein the fourth electrode is a common electrode and has a conductive third elastic reed which is located on an outer side of another end of the axle, the axle driving the third elastic reed to connect the eighth electrode when the direction wheel is moved towards the first side to make the eighth electrode to be electrically connected to the fourth electrode, the third elastic reed being not in contact with the eighth electrode in normal conditions.

4. The multi-direction input device of claim 1, wherein the first electrode is a common electrode and has a conductive second elastic reed which is located on an outer side of one end of the elbow, the elbow being moved towards the second elastic reed when the direction wheel is depressed downwards to drive the second elastic reed in contact with the second electrode to make the first electrode to be electrically connected to the second electrode, and the second elastic reed being not in contact with the second electrode in normal conditions.

5. The multi-direction input device of claim 1, wherein the movable contact includes a metal pin and an elastic element coupling with one end of the metal pin, the elastic element having one end coupled with the sixth electrode, and the metal pin having a top end in contact with the coaxial gear constantly.

6. The multi-direction input device of claim 5, wherein the elastic element is a spring.

7. The multi-direction input device of claim 1, wherein the movable contact is a spring which has one end coupled with the sixth electrode and a top end in contact with the coaxial gear constantly.

8. The multi-direction input device of claim 1, wherein the upper arm of the toggle mechanism has a front end formed a fork to brace the axle of the direction wheel.

9. The multi-direction input device of claim 1, wherein the upper arm of the toggle mechanism has a front end formed an annular ring to brace the axle of the direction wheel.

10. The multi-direction input device of claim 1 further having an upper cap located respectively above two ends the axle to confine the axle.

11. The multi-direction input device of claim 1 further having a detent strut on the second side of the direction wheel extending towards the toggle mechanism, and the upper arm having an extended bucking lump.

* * * * *